US006715676B1

(12) United States Patent
Janning (10) Patent No.: US 6,715,676 B1
(45) Date of Patent: Apr. 6, 2004

(54) METHODS AND APPARATUS FOR AN ELECTRONIC PRICE LABEL SYSTEM

(75) Inventor: John L. Janning, Dayton, OH (US)

(73) Assignee: NCR Corporation, Dayton, OH (US)

( * ) Notice: Subject to any disclaimer, the term of this patent is extended or adjusted under 35 U.S.C. 154(b) by 76 days.

(21) Appl. No.: 09/723,651

(22) Filed: Nov. 28, 2000

(51) Int. Cl.[7] .............................................. G06K 15/00
(52) U.S. Cl. ...................... 235/383; 235/375; 235/378; 235/385
(58) Field of Search .................... 235/375, 383, 235/378, 385

(56) References Cited

U.S. PATENT DOCUMENTS

| | | | | |
|---|---|---|---|---|
| 3,743,847 A | * | 7/1973 | Boland | 136/257 |
| 4,002,886 A | | 1/1977 | Sundelin | 231/61 |
| 4,044,231 A | * | 8/1977 | Beck et al. | 235/488 |
| 4,139,149 A | | 2/1979 | Crepeau et al. | 235/383 |
| 4,240,716 A | | 12/1980 | Camlibel et al. | 350/363 |
| 4,240,717 A | | 12/1980 | Camlibel et al. | 350/363 |
| 4,521,677 A | | 6/1985 | Sarwin | 235/385 |
| 4,766,295 A | | 8/1988 | Davis et al. | 235/383 |
| 4,823,009 A | * | 4/1989 | Biemann et al. | 250/304 |
| 4,833,317 A | * | 5/1989 | Huggins | 250/208.3 |
| 4,888,709 A | | 12/1989 | Revesz et al. | 364/518 |
| 5,019,811 A | | 5/1991 | Olsson et al. | 340/825.11 |
| 5,190,653 A | | 3/1993 | Herrick et al. | 210/477 |
| 5,198,644 A | | 3/1993 | Pfeiffer et al. | 235/383 |
| 5,245,534 A | | 9/1993 | Waterhouse et al. | 364/404 |
| 5,299,117 A | | 3/1994 | Farnbach | 364/405 |
| 5,313,569 A | | 5/1994 | Olsson et al. | 395/118 |
| 5,348,485 A | | 9/1994 | Briechle et al. | 439/110 |
| 5,374,815 A | | 12/1994 | Waterhouse et al. | 235/383 |
| 5,448,226 A | * | 9/1995 | Failing et al. | 235/383 |
| 5,465,085 A | | 11/1995 | Caldwell et al. | 340/825.35 |
| 5,473,146 A | | 12/1995 | Goodwin, III | 235/383 |
| 5,537,126 A | | 7/1996 | Kayser et al. | 345/1 |

(List continued on next page.)

Primary Examiner—Michael G. Lee
Assistant Examiner—Seung H Lee
(74) Attorney, Agent, or Firm—Priest & Goldstein, PLLC; Paul W. Martin (57) ABSTRACT

Systems and methods for an electronic price label (EPL) system are described. A first embodiment includes a host computer system which originates a message which is relayed to an array of infrared (IR) light emitting diodes (LEDs) which is mounted in the ceiling of a retail establishment. The IR array transmits the message to an EPL which is preferably attached to a store shelf. In one aspect, the EPL does not include a transmitter and does not respond to the message. In another aspect, the EPL includes a radio frequency transmitter and transmits an acknowledgement to the message. A second embodiment includes a host computer system which originates a message which is relayed to a mobile programming unit. The mobile programming unit moves down an aisle which contains a plurality of EPLs and transmits the message to these EPLs using an infrared or ultrasonic transmitter. A third embodiment includes an EPL which is powered solely by a capacitor which is charged by a solar cell.

10 Claims, 8 Drawing Sheets

U.S. PATENT DOCUMENTS

| | | | |
|---|---|---|---|
| 5,539,393 A | 7/1996 | Barfod | 340/825.52 |
| 5,548,282 A | 8/1996 | Escritt et al. | 340/825.35 |
| 5,553,412 A | 9/1996 | Briechle et al. | 40/642 |
| 5,570,216 A | 10/1996 | Lu et al. | 359/101 |
| 5,572,653 A * | 11/1996 | DeTemple et al. | 345/501 |
| 5,638,046 A * | 6/1997 | Malinowski | 340/506 |
| 5,736,967 A | 4/1998 | Kayser et al. | 345/1 |
| 5,742,237 A | 4/1998 | Bledsoe | 340/825.49 |
| 5,747,786 A | 5/1998 | Cargin, Jr. et al. | 235/472 |
| 5,751,257 A | 5/1998 | Sutherland | 345/2 |
| 5,753,900 A | 5/1998 | Goodwin, III et al. | 235/383 |
| 5,764,200 A | 6/1998 | Odmark | 345/2 |
| 5,794,211 A | 8/1998 | Goodwin, III et al. | 705/23 |
| 5,847,378 A | 12/1998 | Goodwin, III | 235/383 |
| 5,864,325 A | 1/1999 | Briechle et al. | 345/1 |
| 5,870,067 A * | 2/1999 | Smith | 345/1 |
| 5,870,714 A * | 2/1999 | Shetty et al. | 705/20 |
| 5,910,653 A * | 6/1999 | Campo | 250/214 AL |
| 5,929,770 A * | 7/1999 | Faita | 340/825.35 |
| 5,929,778 A * | 7/1999 | Asama et al. | 340/825.554 |
| 5,933,813 A * | 8/1999 | Teicher et al. | 705/26 |
| 5,963,133 A * | 10/1999 | Monjo | 340/572.1 |
| 5,977,998 A * | 11/1999 | Briechle et al. | 345/520 |
| 5,987,425 A * | 11/1999 | Hartman et al. | 705/20 |
| 5,988,498 A * | 11/1999 | Hoell | 235/383 |
| 5,995,015 A * | 11/1999 | DeTemple et al. | 340/825.49 |
| 6,016,481 A * | 1/2000 | Failing, Jr. et al. | 705/28 |
| 6,300,880 B1 * | 10/2001 | Sitnik | 235/375 |
| 6,340,958 B1 * | 1/2002 | Cantu et al. | 235/383 |
| 6,369,342 B1 * | 4/2002 | Buck | 219/58 |

* cited by examiner

METHODS AND APPARATUS FOR AN ELECTRONIC PRICE LABEL SYSTEM

The present invention is related to the following commonly assigned and co-pending U.S. applications: U.S. patent application Ser. No. 09/723,783 entitled "Methods and Apparatus for an Electronic Price Label System" filed on the same date as the present application and incorporated by reference herein in its entirety, and U.S. patent application Ser. No. 09/723,808 entitled "Methods and Apparatus for a Gondola based Electronic Price Label System" filed on the same date as the present application and incorporated by reference herein in its entirety.

FIELD OF THE INVENTION

The present invention relates generally to improvements in electronic price label (EPL) systems used in transaction establishments. More specifically, the present invention relates to improvements in EPL systems including systems and methods for an infrared (IR) wireless EPL system which reduces costs and increases the flexibility of the EPL system.

BACKGROUND OF THE INVENTION

EPL systems typically include a plurality of EPLs for each merchandise item in a store. EPLs display the price of corresponding merchandise items on store shelves and are typically attached to a rail along the leading edge of the shelves. A store may contain thousands of EPLs to display the prices of the merchandise items. The EPLs are coupled to a central server where information about the EPLs is typically maintained in an EPL data file which contains EPL identification information and EPL merchandise item information. The central server sends messages, including price change messages, to the EPLs.

Prior EPL systems suffer from various disadvantages. A typical prior art EPL includes a variety of components, such as a display, a radio frequency (RF) transmitter, an RF receiver, memory and a battery which supplies power to the EPL. The RF receiver is bulky and adds considerable cost to the price of the EPL tag. Additionally, the RF receiver consumes a significant amount of power, limiting the operating life of the battery. Replacing the battery in an EPL is a manual and laborious process which involves a store employee going to the location of the EPL, removing the discharged battery and inserting a new battery into the EPL.

Therefore, it would be desirable to provide an EPL system and method that includes an EPL which does not include an RF receiver and is cheaper, weighs less and provides a lower cost of ownership than prior EPLs.

SUMMARY OF THE INVENTION

The present invention advantageously provides methods and apparatus for an improved electronic price label (EPL) system. A first embodiment of the present invention includes a host computer system which transmits a message to a relay unit which includes an array of infrared (IR) light emitting diodes (LEDs) mounted in the ceiling of a retail establishment. The IR array transmits the message to an EPL which is preferably attached to a store shelf. The EPL advantageously does not include a radio frequency receiver, but instead uses a solar cell to detect the incoming IR message. In one aspect, the EPL does not include a transmitter and does not respond to the message. In another aspect, the EPL includes a radio frequency transmitter and transmits an acknowledgement message to a retransmission unit which, in turn, retransmits the acknowledgement message to the host computer system over an RF, IR or wired link.

A second embodiment includes a host computer system which originates a message to be relayed to a mobile programming unit. The mobile programming unit moves down an aisle which contains an EPL and transmits the message to an EPL using an infrared or ultrasonic transmitter. In another aspect, the EPL includes an IR transmitter and transmits an acknowledgement message to a mobile programming unit which, in turn, retransmits the acknowledgement message to the host computer system over an RF, IR or wired link.

An EPL in accordance with one aspect the present invention does not include an RF receiver and is powered solely by a capacitor which is charged by a solar cell.

An EPL in accordance with another aspect of the present invention includes a battery and transmits a message to a host computer system indicating that the battery needs to be replaced.

A more complete understanding of the present invention, as well as further features and advantages of the invention, will be apparent from the following detailed description and the accompanying drawings.

DETAILED DESCRIPTION

The present invention now will be described more fully with reference to the accompanying drawings, in which several presently preferred embodiments of the invention are shown. This invention may, however, be embodied in various forms and should not be construed as limited to the embodiments set forth herein. Rather, these embodiments are provided so that this disclosure will be thorough and complete, and will fully convey the scope of the invention to those skilled in the art.

Figure 1:
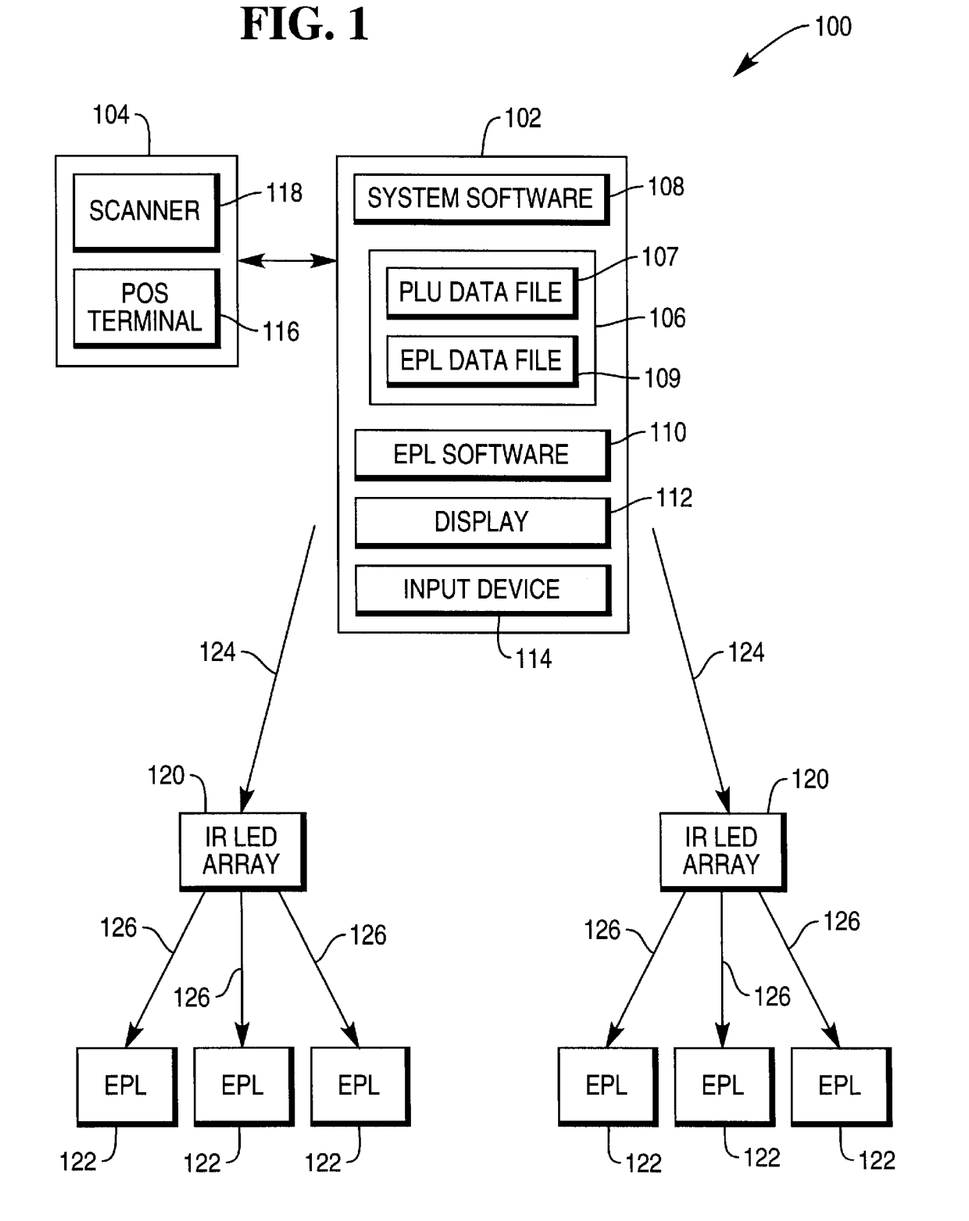
FIG. 1 shows a block diagram of a first embodiment of a transaction management system in accordance with the present invention.

FIG. 1 shows a transaction management system 100 in accordance with the present invention. The system 100 includes a host computer system 102 and a point-of-service (POS) system 104. Here, components 102 and 104 are shown as separate components that are networked together, but they and their subcomponents may also be combined or divided in various ways. Thus, host computer system 102 may be a POS terminal which doubles as a host computer for a network of other POS terminals.

The host computer system 102 includes a storage medium 106, system software 108, EPL software 110, a display 112 and an input device 114. The storage medium 106 includes a PLU data file 106 which stores item prices which are available for distribution to a POS terminal 116 by the host system 102. Alternatively, provision may be made for a bar code scanner 118 to directly access the PLU data file 106. The storage medium 106 also includes EPL data file 109 which contains item information, such as a PLU number and EPL identification information for each of the EPLs 122. The system 102 executes system software 108 which updates the contents of storage medium 106 and performs various system functions. Input device 114 is preferably a keyboard, but it will be recognized that data can be entered in a variety of alternative manners.

POS system 104 includes bar code scanner 118 and POS terminal 116.

The system 100 also includes light emitting diode (LED) infrared (IR) array units 120 and EPLs 122. The IR array units 120 may be suitably mounted in or near the ceiling of the retail establishment. EPLs 122 are typically attached to store shelving adjacent to items.

EPL software 110 records, schedules, and transmits all messages to EPLs 122. EPL software 110 transmits messages, including price change messages, to EPLs 122 utilizing the IR array units 120 which are placed periodically across a ceiling. These messages are sent to the IR array units 120 through communications link 124. While in a preferred embodiment communications link 124 utilizes radio frequency (RF) communication, IR communication, a wired link, or some combination of communication techniques may also be used.

After receiving a message from the host system 102, the IR array units 120 then transmit the message to the EPLs 122 utilizing IR communications link 126. The IR array units 120 include a receiver and a plurality of IR diode emitters, or light emitting diodes (LEDs), preferably pointing in multiple directions, which are pulsed with a short duty cycle to produce high instantaneous power for communication to the EPLs 122. Such a system may operate with an applied peak power on the order of one watt per LED. In an alternative embodiment, the applied peak power may be on the order of one kilowatt for a periodic duty cycle portion on the order of about one millisecond per pulse. Such a system may advantageously achieve a communications distance of 300 feet or greater. EPLs 122 then receive the message and take the appropriate action. For example, if the message is a price change message addressed to a particular EPL 122, that EPL 122 would decode the message and update the price displayed. In order to ensure the reception of the message, the IR arrays may transmit the message multiple times, such as three times, as directed by the host system. Additionally, as described below, to increase the communication effectiveness of the system, the EPLs are coated with infrared reflective material which ensures that the IR signals are reflected around the store, reaching EPLs which may not necessarily be in the direct line of sight from the IR array units 120.

The IR arrays 120 may be grouped along the ceiling such that there is an overlapping zone of coverage for each EPL 122. In other words, each EPL 122 would be within reception range of at least two IR array units 120.

In another aspect, only a subset of the IR array units 120 which are in an area near the target EPL 122 transmit the message to the target EPL 122.

In a preferred embodiment, EPLs 122 do not contain any transmission circuitry, and thus, do not respond to any message transmitted by the IR array units 120. This lack of transmission circuitry advantageously reduces both the cost and the power consumption of the EPL 122.

Figure 2:
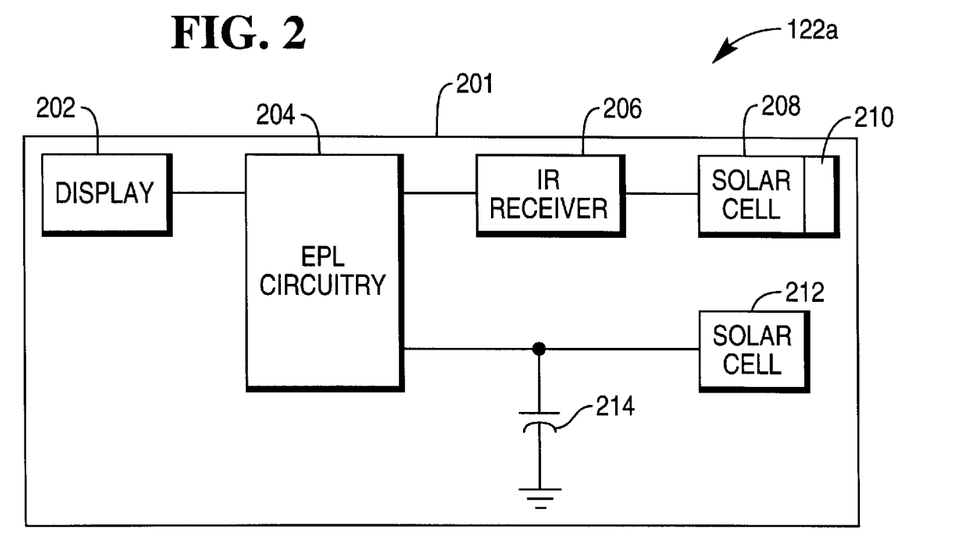
FIG. 2 is a block diagram of an EPL in accordance with a first aspect of the present invention.

FIG. 2 shows a block diagram of a first embodiment of an EPL 122a in accordance with the present invention. The EPL 122a includes a housing 201 which may be at least partially coated with an infrared reflective material 230 such as aluminum, copper or white paint. The operation of EPL 122a is controlled by EPL circuitry 204. A display 202 displays information, such as item price and related data. EPL 122a includes a first solar cell 208, such as a silicon photo detector, for example, which captures light and passes a signal representing the received light to an IR receiver 206 which is connected to EPL circuitry 204. EPL circuitry 204 decodes incoming messages received, and performs any actions indicated by the messages. For example, if a price change message is received, the EPL circuitry would cause the display 202 to be updated with the new price information.

Solar cell 208 includes an IR filter 210 which attenuates the visible portion of the received spectrum while leaving the IR portion substantially intact. The filter 210 may be composed of a variety of materials including acrylic plastic, for example. The filter 210 reduces the ambient level of stimulation from other light sources, such as incandescent lighting, fluorescent lighting and sunlight, and reduces the 60 Hz noise signal emitted from these other light sources. Power to operate the EPL 122a is provided by a capacitor 214 which is charged by a second solar cell 212. Since it does not include an RF transmitter, RF receiver or a battery, the EPL 122a is smaller and cheaper to manufacture than prior art EPLs which include these components. Additionally, the EPL 122a can be operated with low maintenance costs since it does not include a battery which must be periodically replaced.

In another aspect of the present invention, EPL circuitry 204 monitors the charged state of the capacitor 214 and shuts down at least some of the components of EPL 122 until the capacitor 214 returns to a sufficiently charged state. Since the power to operate the EPL 122a comes from the solar cell 212 which collects power from room lighting, this ability to enter a reduced power mode will allow the EPL to expend power on critical uses only, such as maintaining a memory of the stored price, and then resume normal operation when normal lighting conditions resume.

Figure 3:
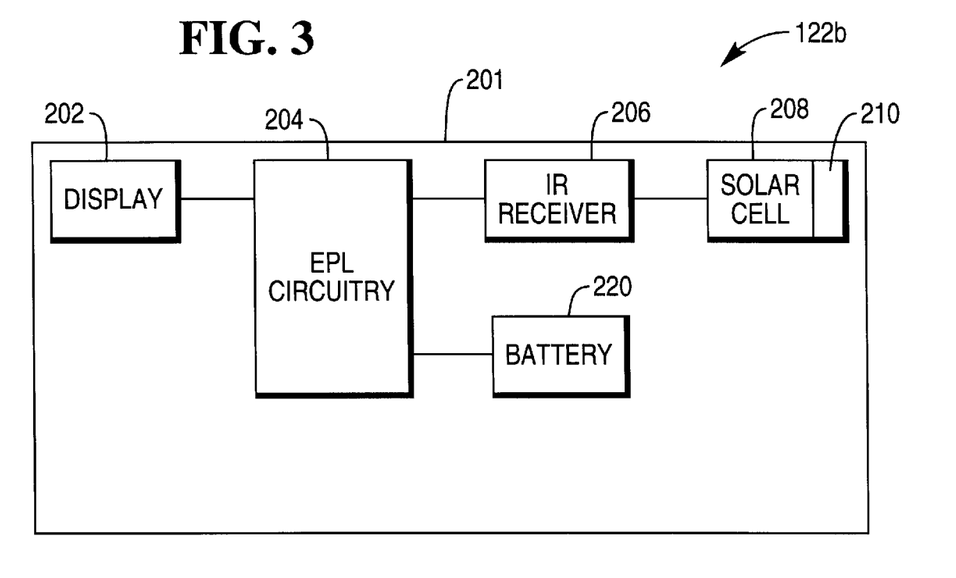
FIG. 3 is a block diagram of an EPL in accordance with a second aspect of the present invention.

FIG. 3 shows a block diagram of a second embodiment of an EPL 122b in accordance with the present invention. The EPL 122b includes many of the same components as EPL 122a, but does not include the solar cell 212. Instead, the power to the EPL 122b is supplied by a replaceable battery 220.

Figure 4:
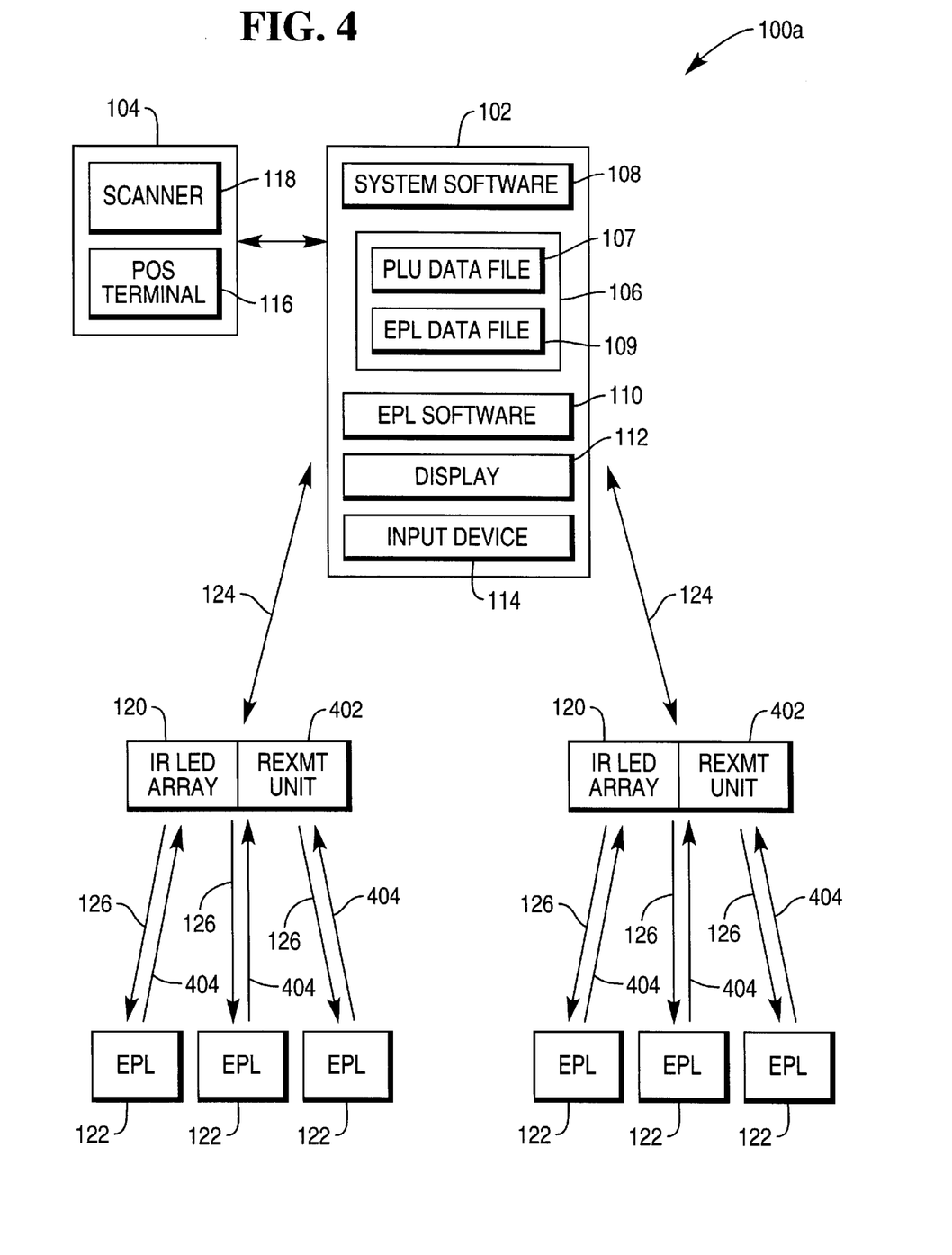
FIG. 4 shows a block diagram of a second embodiment of a transaction management system in accordance with the present invention.

FIG. 4 shows a block diagram of a transaction management system 100a in accordance with another aspect of the present invention. Transaction management system 100a includes many of the same elements of transaction management system 100, with common elements to both embodiments designated by the same element number. The system 100a includes a retransmission unit 402 for receiving a message, such as an acknowledgement message, from EPLs 122 and retransmitting that message to the host system 102. In a preferred embodiment, the retransmission unit 402 is included with the IR array unit 120, as shown in FIG. 4, and utilizes communication link 124 to communicate with the host system 102. As described above, communications link 124 may be adapted for radio frequency (RF) communication, IR communication or a wired link communication. The EPLs 122 transmit messages to unit 402 utilizing communication link 404 which may be an RF or an IR communication link.

Figure 5:
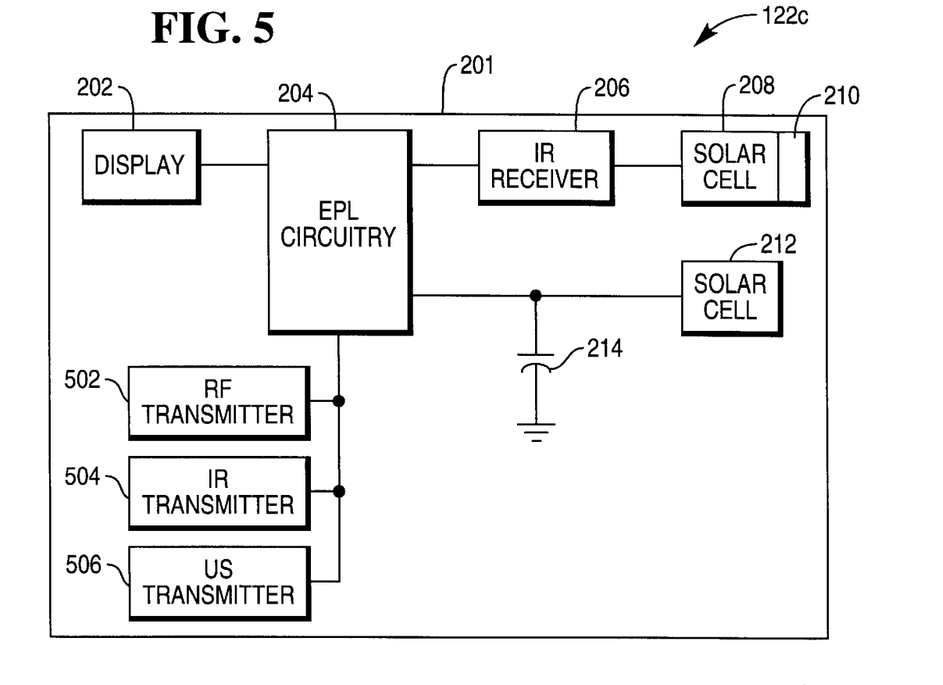
FIG. 5 shows a block diagram of an EPL in accordance with a third aspect of the present invention.
Figure 6:
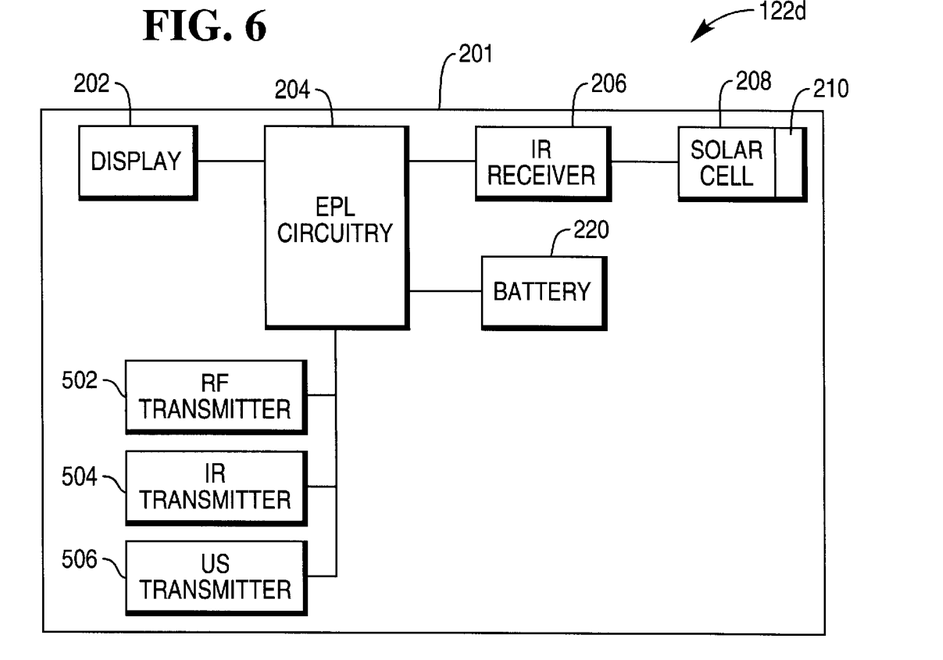
FIG. 6 shows a block diagram of an EPL in accordance with a fourth aspect of the present invention.

FIGS. 5 and 6 show block diagrams of EPLs 122c and 122d in accordance with another aspect the present invention. The EPLs 122c and 122d may be used as a part of the transaction management system 100a to transmit a message to host system 102 through the retransmission units 402. In addition to the components described above for EPLs 122a and 122b, EPLs 122c and 122d include a transmitter, such as RF transmitter 502, IR transmitter 504 or ultrasonic transmitter 506, to transmit a message. For example, when a price change message has been received, the EPL 122c may transmit an acknowledgement message, indicating that the price change message was received and a new price is now being displayed.

In another aspect of the present invention, EPL circuitry 204 of EPL 122d monitors the charged state of the battery 220 and provides an indication when charge of the battery 220 is low and needs to be replaced. EPL 122d may advantageously send a replace battery message to the host system 102 which will inform a store employee of the maintenance need.

Figure 7:
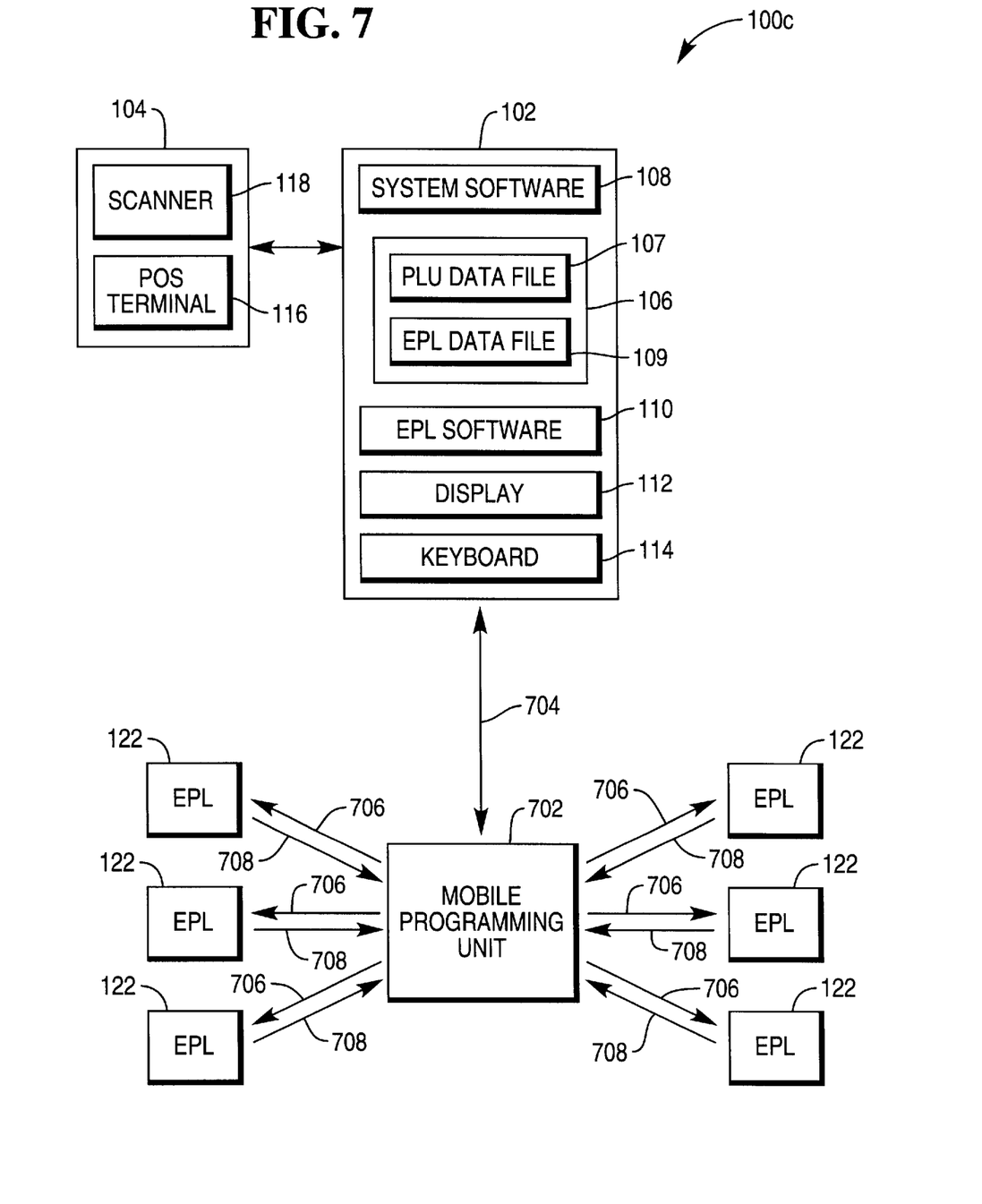
FIG. 7 shows a block diagram of a transaction management system including a mobile programming unit in accordance with the present invention.

FIG. 7 shows a transaction management system 100c in accordance with another aspect of the present invention. Transaction management system 100c includes many of the same elements of transaction management system 100, with common elements to both embodiments designated by the same element number. A mobile programming unit 702 communicates with the host system 102 over communications link 704, which may be an RF, IR or other communications link, to receive price updates or other messages to be transmitted to the EPLs 122. The mobile programming unit 702 then moves down the aisles of the store, transmitting the messages to the EPLs 122 and acting as a satellite unit in close proximity to the EPLs 122 which are preferably attached to store shelves. The mobile programming unit 702 employs IR communications link 706 to transmit the messages to the EPLs 122. Due to the close proximity of the EPLs 122, typically less than fifteen feet away from the mobile programming unit 702, less power can be used to transmit the messages to the EPLs 122, and higher reliability communication can be achieved.

If it is desired for the EPLs 122 to respond to the transmitted messages, EPLs such as EPLs 122c and 122d may be utilized to transmit a response over communications link 708, which may be an IR, RF or ultrasonic link, for example. The mobile programming unit 702 will then retransmit the response to the host system 102 over communications link 704. The mobile programming unit 702 may be attached to a wheeled cart which is pushed through the aisles, or a store employee may carry the unit 702.

Additionally, as the mobile programming unit 702 is moved down an aisle, the mobile programming unit 702 may transmit messages to only those EPLs which are located on the aisle utilizing an address code for the EPLs which is derived from a code for the aisle.

Figure 8:
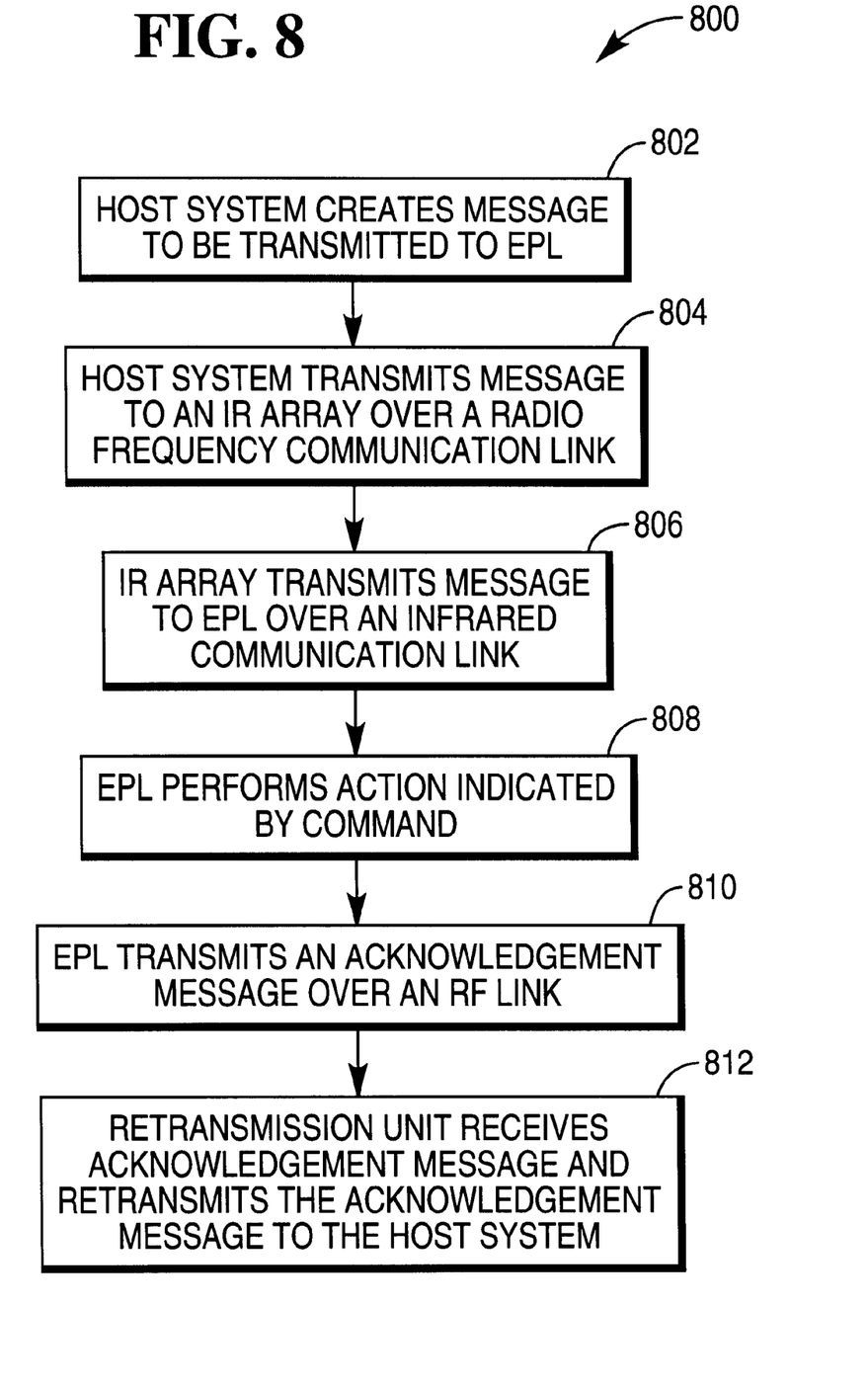
FIG. 8 shows a method of communicating with an EPL using an infrared (IR) array in accordance with the present invention.

FIG. 8 shows a method 800 of communicating with an EPL, such as EPL 122, in accordance with the present invention. In step 802, a host computer system creates a message to be transmitted to the EPL. In step 804, the host computer system transmits the message to an IR LED array, such as array 120, over an RF communication link, such as communication link 124. Next, in step 806, the IR LED array transmits the message to the EPL over an IR communication link 126. In one aspect of the present invention, the message is transmitted in duplicate to ensure proper reception by the EPL. The EPL then performs the action indicated by the command, such as updating a displayed price, in step 808. In step 810, the EPL transmits an acknowledgement message over an RF link indicating that the message was received successfully. Next, in step 812, a retransmission unit, such as retransmission unit 402, receives the acknowledgement message and retransmits the acknowledgement message to the host computer system over an RF communication link.

Figure 9:
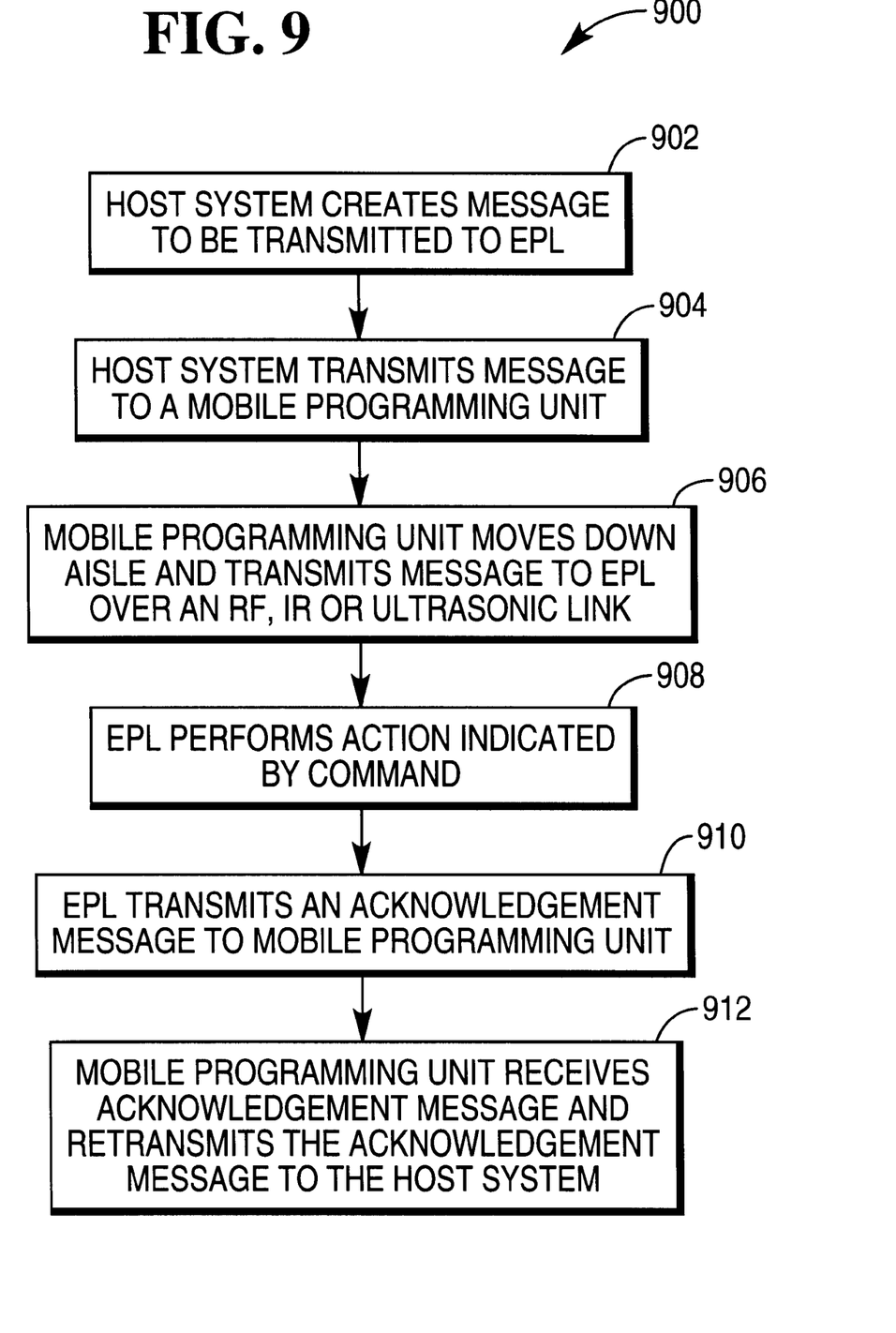
FIG. 9 shows a method of communicating with an EPL using a mobile programming unit in accordance with the present invention.

FIG. 9 shows a method 900 of communicating with an EPL, such as EPL 122, in accordance with the present invention. In step 902, a host computer system creates a message to be transmitted to the EPL. In step 904, the host computer system transmits the message to a mobile programming unit over a communication link, such as communication link 124, which may include RF, IR or wired communication. Next, in step 906, the mobile programming unit is moved down an aisle on which the EPL is attached to a store shelf. While the mobile programming unit is moving down the aisle, it transmits the message to the EPL over a communication link, such as communication link 126, which may utilize RF, IR or ultrasonic communication techniques. The EPL then performs the action indicated by the command, such as updating a displayed price, in step 908. In step 910, the EPL transmits an acknowledgement message indicating that the message was received successfully. Next, in step 912, the mobile programming unit receives the acknowledgement message and retransmits the acknowledgement message to the host computer system over an RF, IR or wired communication link.

Figure 10:
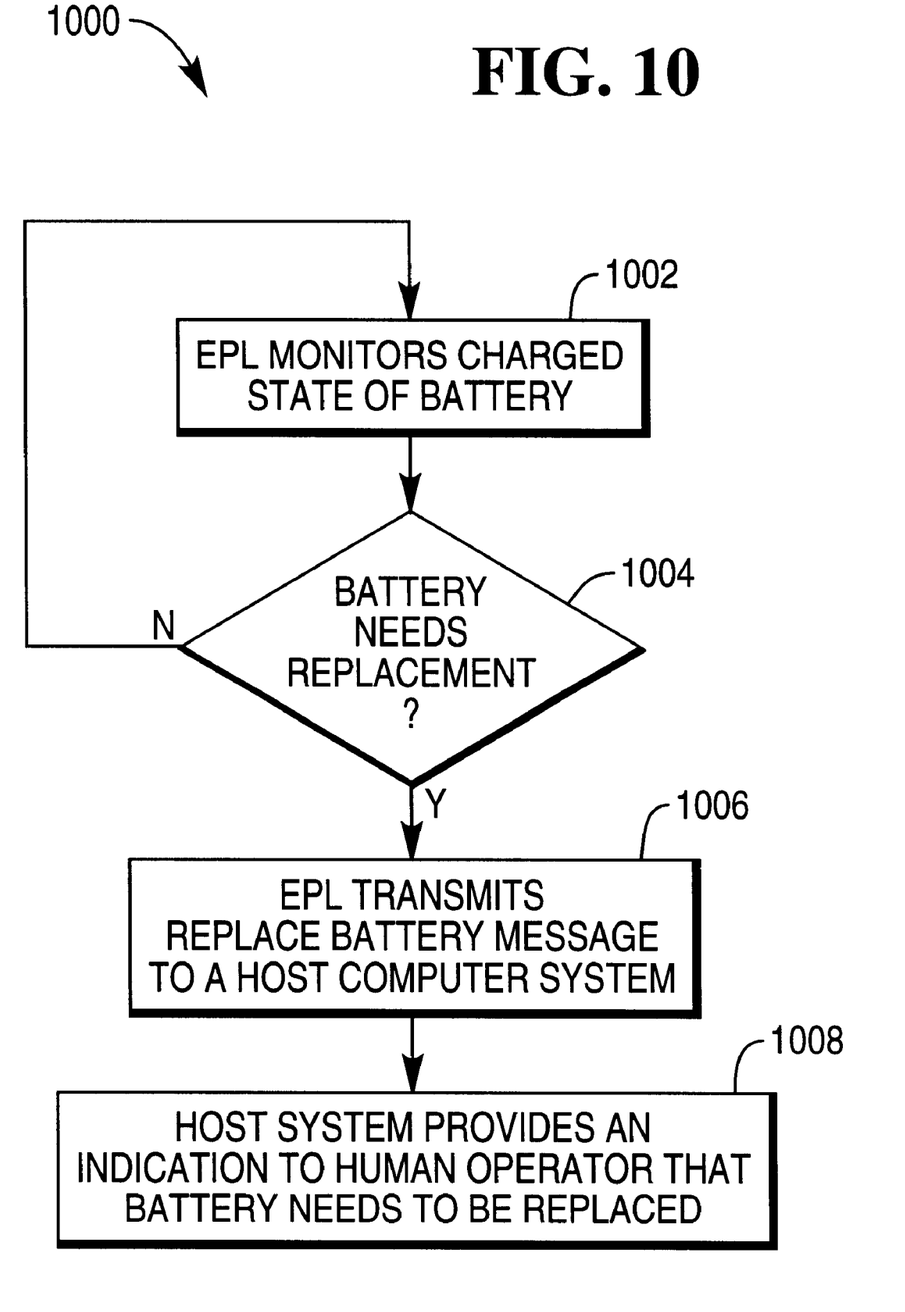
FIG. 10 shows a method of determining when an EPL battery needs to be replaced in accordance with the present invention.

FIG. 10 shows a method 1000 of determining when an EPL battery needs to be replaced in accordance with the present invention. In step 1002, the EPL monitors the charged state of a battery which supplies power to the EPL. In step 1004, the EPL determines if the charged state has dropped to a level which indicates the battery needs to be replaced. If the battery does not need to be replaced, the method continues to step 1002. If the battery needs to be replaced, a replace battery message is transmitted to a host computer system in step 1006. Next, in step 1008, the host computer system provides an indication to a human operator that the charged state of the battery is low and that the battery needs to be replaced.

It will be apparent to those skilled in the art that various modifications and variations can be made in the present invention without departing from the spirit and scope of the present invention. Thus, it is intended that the present invention cover the modifications and variations of this invention provided they come within the scope of the appended claims and their equivalents.

I claim:

1. An electronic price label (EPL) comprising:
    a display for displaying price information of an item associated with the EPL;
    an infrared receiver for receiving data signals from an infrared transmitter;
    circuitry for causing the display to display the received price;

a radio frequency (RF) transmitter for transmitting a response signal;

infrared reflective material to reflect infrared signals throughout a retail establishment.

2. The electronic price label system of claim 1 wherein the EPL includes an infrared reflective material.

3. The electronic price label system of claim 1 wherein the EPL includes a capacitor which supplies all of the power for the EPL.

4. The electronic price label system of claim 3 wherein the EPL includes a solar cell by which the capacitor is charged.

5. The electronic price label system of claim 4 wherein the EPL includes a second solar cell for receiving the IR signals.

6. An electronic price label (EPL) system comprising:

a host computer system for creating a message;

a mobile programming unit for receiving the message and retransmitting the message by infrared transmission; and an EPL for receiving the message, wherein the EPL includes infrared reflective material for reflecting infrared signals from the mobile programming unit throughout a retail establishment;

wherein the mobile programming unit addresses the EPL using address data derived in part with a code for an aisle along which the mobile programming unit is moved.

7. The electronic price label system of claim 6 wherein the EPL is mounted on a store shelf on the aisle and the mobile programming unit is moved down the aisle while transmitting the message.

8. The electronic price label system of claim 7 wherein the message includes a command to change a displayed price by the EPL.

9. The electronic price label system of claim 8 wherein the EPL updates the displayed price as the mobile programming unit moves past the EPL.

10. A method of communicating with an electronic price label (EPL) located on an aisle of a retail establishment comprising the steps of:

transmitting a message from a host computer system over a radio frequency (RF) communication link;

receiving the message by a mobile programming unit;

moving the mobile programming unit along the aisle;

transmitting the message to the EPL over an infrared communication link, wherein the mobile programming unit addresses the EPL using address data derived in part with a code for the aisle along which the mobile programming unit is moved;

receiving the message from the mobile programming unit by the EPL; and reflecting infrared signals from the mobile programming unit throughout the retail establishment by infrared reflective material on the EPL.

\* \* \* \* \*